(12) United States Patent
Schmidt

(10) Patent No.: US 8,704,625 B2
(45) Date of Patent: Apr. 22, 2014

(54) ELECTROMAGNETIC ENERGY TRANSDUCER

(75) Inventor: Frank Schmidt, Zorneding (DE)

(73) Assignee: EnOcean GmbH, Oberhaching (DE)

( * ) Notice: Subject to any disclaimer, the term of this patent is extended or adjusted under 35 U.S.C. 154(b) by 0 days.

(21) Appl. No.: 13/555,912

(22) Filed: Jul. 23, 2012

(65) Prior Publication Data

US 2012/0293288 A1    Nov. 22, 2012

Related U.S. Application Data

(63) Continuation of application No. 13/024,141, filed on Feb. 9, 2011, now Pat. No. 8,228,151, which is a continuation of application No. 12/757,488, filed on Apr. 9, 2010, now abandoned, which is a continuation of application No. 11/245,615, filed on Oct. 6, 2005, now Pat. No. 7,710,227, which is a continuation of application No. PCT/DE2004/000681, filed on Apr. 1, 2004.

(30) Foreign Application Priority Data

Apr. 7, 2003 (DE) .................................. 103 15 765

(51) Int. Cl.
*H01F 1/00* (2006.01)
*H01F 3/00* (2006.01)
*H01F 7/00* (2006.01)
*H02K 33/00* (2006.01)
*H02K 17/42* (2006.01)

(52) U.S. Cl.
USPC ........... 335/296; 335/229; 335/230; 335/238; 335/284; 335/297; 335/298; 335/302; 335/306; 310/12.12; 310/15; 310/29; 310/36; 310/168; 310/171

(58) Field of Classification Search
USPC ......... 335/229–230, 238, 284, 296–299, 302, 335/306; 310/12.12, 15, 29, 36–39, 168, 310/171; 317/81, 93
See application file for complete search history.

(56) References Cited

U.S. PATENT DOCUMENTS 2,135,843 A * 11/1938 Pye ................................. 310/36
2,436,354 A 2/1948 Crooks et al.
(Continued)

FOREIGN PATENT DOCUMENTS

DD    226069    8/1985
DE    25 32 621    2/1977
(Continued)

OTHER PUBLICATIONS

Brochure of the SDS Relais AG, Feb. 1990 (6 pages).

*Primary Examiner* — Mohamad Musleh
(74) *Attorney, Agent, or Firm* — Foley & Lardner LLP

(57) ABSTRACT

An electromagnetic energy transducer configured to convert mechanical energy into electrical energy comprises two magnetic elements including a permanent magnetic element and a soft-magnetic element and an electrical coil. The permanent magnetic element and the soft-magnetic element are arranged to form a magnetic circuit and one of the two magnetic elements is movable in relation to the other of the two magnetic elements. The electrical coil surrounds a part of the soft magnetic element. The movable magnetic element is held in a first position by a spring force and moved into a second position by applying an external mechanical force exceeding the spring force, and at the first position the magnetic flux within the soft magnetic element is different than the flux at the second position.

16 Claims, 2 Drawing Sheets

(56) References Cited

U.S. PATENT DOCUMENTS

| | | | | |
|---|---|---|---|---|
| 2,471,741 A | * | 5/1949 | Harris | 310/36 |
| 2,784,327 A | * | 3/1957 | Drescher | 310/36 |
| 2,832,902 A | * | 4/1958 | Drescher | 310/15 |
| 2,904,707 A | * | 9/1959 | Drescher | 310/15 |
| 3,116,428 A | * | 12/1963 | Blodgett et al. | 310/15 |
| 3,130,332 A | * | 4/1964 | Zehfeld et al. | 310/15 |
| 3,348,080 A | * | 10/1967 | Lair | 310/29 |
| 3,480,808 A | | 11/1969 | Rieth et al. | |
| 3,582,695 A | * | 6/1971 | Wannamaker | 310/15 |
| 3,693,033 A | | 9/1972 | Troesh | |
| 3,799,205 A | | 3/1974 | Fisher et al. | |
| 3,928,988 A | | 12/1975 | Luth | |
| 3,984,707 A | | 10/1976 | McClintock | |
| 4,367,449 A | | 1/1983 | Veisz et al. | |
| 4,412,355 A | | 10/1983 | Terbrack et al. | |
| 4,471,353 A | | 9/1984 | Cernik | |
| 4,625,191 A | | 11/1986 | Oberndorfer et al. | |
| 4,727,344 A | | 2/1988 | Koga et al. | |
| 4,831,299 A | | 5/1989 | Hayasaka | |
| 4,881,054 A | | 11/1989 | Polgar | |
| 5,150,090 A | | 9/1992 | Miura et al. | |
| 5,227,750 A | | 7/1993 | Connell et al. | |
| 5,608,366 A | | 3/1997 | Sako | |
| 6,271,660 B1 | | 8/2001 | Sprecher, Jr. | |
| 6,479,920 B1 | | 11/2002 | Lal et al. | |
| 7,005,778 B2 | | 2/2006 | Pistor | |
| 7,026,900 B1 | * | 4/2006 | Gregory et al. | 335/220 |
| 7,081,685 B2 | * | 7/2006 | Chiu | 290/1 R |
| 2002/0158727 A1 | | 10/2002 | Namen | |
| 2002/0196110 A1 | | 12/2002 | Vaitkus et al. | |
| 2004/0150277 A1 | * | 8/2004 | Moriyasu | 310/81 |
| 2005/0035600 A1 | | 2/2005 | Albsmeier et al. | |
| 2006/0114084 A1 | | 6/2006 | Ruan et al. | |
| 2007/0075809 A1 | | 4/2007 | Shen et al. | |
| 2008/0217926 A1 | * | 9/2008 | Lemieux | 290/1 R |

FOREIGN PATENT DOCUMENTS

| | | |
|---|---|---|
| DE | 196 27 998 | 8/1997 |
| DE | 198 18 580 | 10/1999 |
| DE | 198 22 781 | 2/2000 |
| DE | 198 39 464 | 3/2000 |
| DE | 198 52 470 | 5/2000 |
| DE | 198 54 949 | 5/2000 |
| DE | 100 11 448 | 9/2000 |
| DE | 100 25 561 | 12/2001 |
| DE | 101 25 059 | 12/2002 |
| GB | 0 856 607 | 12/1960 |
| GB | 1 312 927 | 4/1973 |
| JP | 05-243038 | 1/1900 |
| WO | WO-98/36395 A2 | 8/1998 |
| WO | WO-99/49556 | 9/1999 |
| WO | WO-00/43802 | 7/2000 |
| WO | WO-01/67580 A2 | 9/2001 |
| WO | WO-03/096521 | 11/2003 |

* cited by examiner

ELECTROMAGNETIC ENERGY TRANSDUCER

RELATED APPLICATIONS

This application is a continuation of U.S. application Ser. No. 13/024,141, filed Feb. 9, 2011, which is a continuation of U.S. application Ser. No. 12/757,488, filed Apr. 9, 2010, which is a Continuation of U.S. application Ser. No. 11/245,615, filed Oct. 6, 2005, which is a continuation of International Application No. PCT/DE2004/000681, filed on Apr. 1, 2004, which claims priority from German application no. 103 15 765.4, filed Apr. 7, 2003, the contents of which are hereby incorporated by reference.

FIELD OF THE INVENTION

The invention relates to an electromagnetic energy transducer having a permanent magnet, a soft-magnetic element and an electrical coil.

BACKGROUND OF THE INVENTION

Many different embodiments of electromagnetic energy transducers are known. Generators or electric motors may be mentioned by way of example in this context. In principle, every electromagnetic energy transducer is suitable for conversion of mechanical energy to electrical energy, or of electrical energy to mechanical energy. These electromagnetic energy transducers are generally designed such that mechanical energy in the form of a rotary movement is converted to electrical energy by means of the electromechanical energy transducer.

Electromagnetic energy transducers such as these all have the common task of supplying power to electrical loads continuously and over a lengthy time period, or of converting electrical energy to mechanical energy continuously over a lengthy time period. In this case, various sizes and embodiments are known, depending on the requirement. In this case, it can be assumed as a fundamental rule that the conversion of electrical energy to mechanical energy or of mechanical energy to electrical energy can be carried out with higher efficiencies, that is to say with lower losses, as the size of the electromagnetic transducer increases. Conversely, this means that, the smaller an electromagnetic transducer is intended to be, the greater the proportions of the power losses which occur in the electromagnetic transducer become, or the lower the efficiency becomes. This is particularly important for electromagnetic transducers which supply electrical power to autonomous-power systems, for example radio switches or radio transmitters which do not have a battery-powered or wire-based power supply. Electromagnetic transducers which are used in this way must provide sufficient power for operation of a system such as this at the time at which the power is required. Since the physical conditions for systems such as these are often highly restricted so that it is necessary to use very small electromagnetic transducers, it can also be assumed that the efficiencies will be very low, on the basis of the fundamental rule mentioned above.

SUMMARY OF THE INVENTION

One object of the invention is to provide an electromagnetic energy transducer which represents a power supply for miniaturized autonomous-power systems such as, in particular, radio switches, which power supply provides sufficient power for operation of the system, for example of the radio switch, at the time at which the power is required.

This and other objects are attained in accordance with one aspect of the present invention directed to an electromagnetic energy transducer comprising a permanent magnet, a soft-magnetic element, an electrical coil and stop points. The electrical coil surrounds a part of the magnetic circuit, wherein the permanent magnet and the soft-magnetic element are arranged to form a magnetic circuit with a first flux direction. At least one of the soft-magnetic element and the permanent magnet is mounted for rotary movement about an axis with respect to the other. End points of the rotary movement are formed by the stop points.

Advantageous features of this electromagnetic transducer include that the number of moving elements is small, and the movement is likewise intrinsically somewhat small, since it describes only a predetermined movement distance in one direction in each case, specifically from one stop point to another. There are thus no rotation-dependent friction losses resulting, for example, from roller, ball or journal bearings, which have to withstand high rotation speeds over a long time. The number of components for an energy transducer such as this is also reasonably small, since, in principle, the three components mentioned above, specifically the permanent magnet, the soft-magnetic element and the electrical coil and the connecting axis, describe all of the necessary components. There is no need for complex power taps and transfer systems such as sliding contacts, contact commutators etc., and the friction losses and wear phenomena associated with them therefore do not occur for this reason in the case of the electromagnetic transducer according to this aspect of the invention.

The axis by means of which the permanent magnet and the soft-magnetic element are mounted such that they can rotate with respect to one another causes a reversal of the magnetic flux through the electrical coil in conjunction with the stop points. The stop points allow the magnetic flux to be reversed as quickly as possible, in particular suddenly. This characteristic takes account of the law that the rate of change of the magnetic flux is directionally proportional to the electrical energy converted. The coil, which is in this case preferably arranged around the soft-magnetic element of the magnetic circuit, is thus provided with a very large amount of induction. This is particularly advantageous because this high induction is changed not by closing or opening the magnetic circuit, but is changed by twice the amount by changing the direction of the magnetic circuit. The rapid magnetic flux change which is produced in this way leads to a voltage being induced briefly in the coil, and the electrical energy which is produced in this way can be rectified by means of rectifiers, preferably semiconductor metal contact diodes, and, after temporary storage, a capacitor, for example, can be used for brief operation of a radio switch or radio sensor.

The rotary movement is initiated, for example, by introduction of an additional force, for example by a user. If, by way of example, the soft-magnetic element is located with one end at the north pole of the permanent magnet and with the other end at the south pole of the permanent magnet, then this position is held by the magnetic force. This magnetic holding force must be overcome for operation of the electromagnetic energy transducer. This is done by introduction of an additional external force in the opposite rotation direction to that of the magnetic holding force. If the force that is introduced is greater than the magnetic holding force, a rotary movement starts suddenly in the direction of the introduced force. This on the one hand interrupts the existing magnetic circuit and on the other hand results in it being closed again on reaching the stop points of the magnetic circuit in the opposite direction. If the contact surfaces at the stop points are formed directly by the permanent magnet and the soft-magnetic element, then the magnetic flux is not opposed by any further resistance as would be formed, by way of example, by an air gap so that the magnetic flux can be changed to the maximum extent in an extremely short time.

Two limit positions of the rotary movement are advantageously formed, between which the rotary movement takes place in the form of a rocking movement. Both limit positions represent stable limit positions of the possible rotary movement, assisted by the magnetic latching forces. Whenever an external force is introduced in the opposite direction to that of the magnetic latching force, a sudden snapping action is initiated in this way, and electrical energy is produced. In order to advantageously influence the timing, it is worthwhile to keep the angle described by the rotary movement small, so that the time consumed to carry out the movement is as short as possible. The critical factor with respect to the production of the amount of electrical energy is not the movement distance of the rotary movement but essentially the rate of change of the magnetic flux which is increased, in particular, by the reversal of the magnetic flux.

In one advantageous embodiment, one rest position of the rotary movement is supported by a spring element, to be precise in such a way that the second rest position snaps back again to the first rest position immediately after being reached by the introduction of external force, since the second rest position is kept unstable by the force of the spring element. This means that the operation of the energy transducer takes place by the introduction of external force against the magnetic latching force and against the spring force such that, when the latching force is overcome, this results in a sudden snapping action to the second rest position. Sudden snapping back to the first rest position is likewise achieved, driven by the spring force. The electrical energy which is produced in this way is in consequence twice the amount that would be produced by a simple snapping action from the first rest position to the second rest position.

This is a question of the dimensioning of the spring element as well as a question of the particular application for which the likewise advantageous embodiments which are described briefly in the following text are used.

The spring element can thus be dimensioned together with the magnetic elements in such a way that a rotary movement from the first rest position or the second rest position is assisted by the force of the spring element, so that less external force need be applied in order to operate the electromagnetic transducer. This means that the spring element is not designed to be sufficiently strong to reverse this process again and thus to produce twice the energy.

On the other hand the spring element could, for example, be designed such that the spring force is balanced by the magnetic forces in a mid-position of the rotary movement, thus allowing energy to be produced in the form of a momentary-contact element in both directions. The amount of energy is thus, of course, less than in one of the embodiments mentioned above, but, in the end, this is once again a question of the dimensions of the permanent magnet, soft-magnetic element and coil in this case.

The coil is advantageously arranged around the soft-magnetic element, such that the soft-magnetic element forms a coil core, since this is where the greatest flux change can be achieved by the permanent magnet. An arrangement of the coil around the permanent magnet would in no way achieve this effect.

Since the two elements, the permanent magnet and the soft-magnetic element, are mounted such that they can rotate with respect to one another, it depends in the end on the application which of the two elements is firmly connected to a third element, for example to a housing. The spring is also supported with respect to this housing or third element, in order to exert its force. A spring can also to a certain extent be arranged in the form of a spiral spring or can be arranged on the two elements in such a way that the force acts directly between the two elements. The critical factor for the purposes of the invention is that the coil results in a change, in particular a reversal, of the magnetic flux as a result of the rotary movement, which should be as short as possible. The sudden nature of this change is a critical factor for the electrical energy that is obtained.

By way of example, iron ferrite, a nickel/iron alloy or else so-called electrical or transformer laminates is or are suitable for use as the soft-magnetic material. In the exemplary embodiments mentioned above, the use of an electromagnetic transducer such as this for radio switches or radio sensors, but in particular for radio switches, is particularly advantageous since an electromagnetic transducer such as this can be used to initiate the rotary movement at the time of operation of the radio switch. The rotary movement results in a voltage being induced, which is used to supply power to the radio switch.

According to another aspect of the present invention, an electromagnetic energy transducer configured to convert mechanical energy into electrical energy comprises two magnetic elements including a permanent magnetic element and a soft-magnetic element and an electrical coil. The permanent magnetic element and the soft-magnetic element are arranged to form a magnetic circuit, and one of the two magnetic elements is movable in relation to the other of the two magnetic elements. The electrical coil surrounds a part of the soft magnetic element. The movable magnetic element is held in a first position by a spring force and moved into a second position by applying an external mechanical force exceeding the spring force, and at the first position the magnetic flux within the soft magnetic element is different than the flux at the second position.

At the first position at least in one of direction or strength, the magnetic flux within the soft magnetic element is different than the flux at the second position. The movable magnetic element moves from the second position back into the first position when the external mechanical force no longer exceeds the spring force.

At least one of the soft-magnetic element and the permanent magnetic element is held in a first position by a magnetic holding force. A first and a second limit position are formed for the movement of the movable magnetic element. The first limit position is defined by one set of stop points, and the second limit position is defined by another set of stop points. A stable first or second rest position is formed by magnetic latching forces in the first or second limit position. The movement is through an angle of less than 90°.

The soft-magnetic material is iron, ferrite or a nickel/iron alloy, or is formed from electrical or transformer laminates. The electromagnetic transducer supplies electrical power to an autonomous-device and may further comprise an autonomous-power switch comprising a radio switch or a radio signal transmitter and/or a contact portion configured to receive the applied external mechanical force.

The soft magnetic element comprises a first end and a second end and the permanent magnet comprises a north pole and a south pole. The first end contacts the north pole and the second end contacts the south pole to form the magnetic circuit with the first flux direction, and the first end contacts the south pole and the second end contacts the north pole to form the magnetic circuit with the second flux direction. A first end of the soft magnetic element contacts a north pole of the permanent magnet and a second end of the soft magnetic element contacts a south pole of the permanent magnet in the first rest position, and the first end of the soft magnetic element contacts the south pole of the permanent magnet and the second end of the soft magnetic element contacts the north pole of the permanent magnet in the second rest position.

According to still another aspect of the present invention, a method for converting mechanical energy into electrical energy uses a device that comprises two magnetic elements including a permanent magnetic element and a soft-magnetic element and an electrical coil. The permanent magnetic element and the soft-magnetic element are arranged to form a magnetic circuit with a magnetic flux within the soft magnetic element. One of the two magnetic elements is movable in relation to the other of the two magnetic elements. The electrical coil surrounds a part of the soft magnetic element. The method comprises applying a spring force to the movable magnetic element for holding the moveable magnetic element in a first position. An external mechanical force that exceeds the spring force is applied against the spring force for moving the movable magnetic element into a second position so that the magnetic flux within the soft magnetic element is changed.

At least the direction or the strength of the magnetic flux within the soft magnetic element is changed. The external mechanical force is reduced to a level that no longer exceeds the spring force.

DETAILED DESCRIPTION OF THE DRAWINGS

Figure 1:
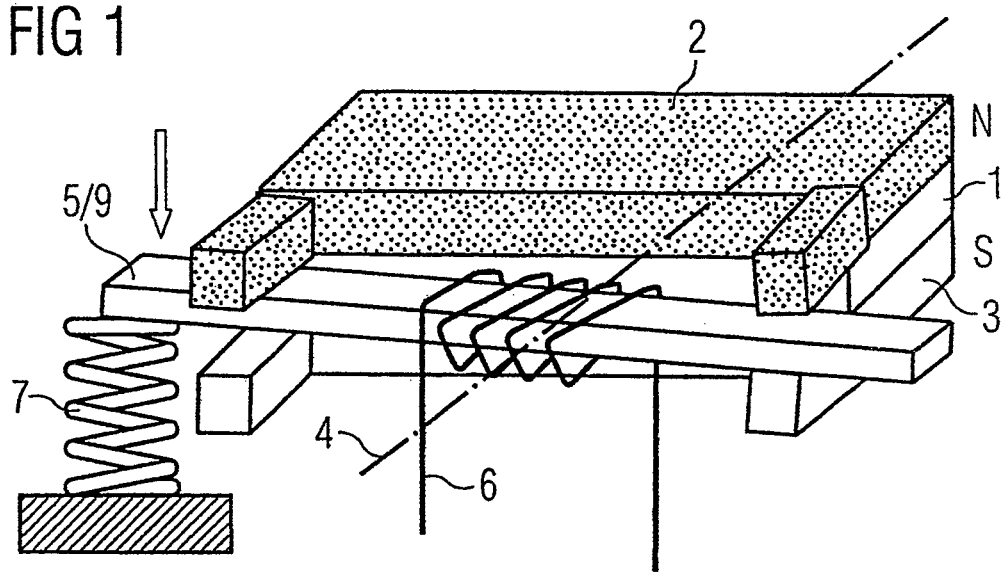
FIG. 1 shows an electromagnetic transducer in a first rest position.

FIG. 1 shows an electromagnetic transducer according to an embodiment of the invention in which a permanent magnet 1 is formed, with a first permanent-magnet layer 2 and a second permanent-magnet layer 3. An axis 4 forms the rotation axis, about which the rotary movement takes place. In this embodiment, a moving element 5 is mounted by means of the axis 4 such that it can rotate with respect to the permanent magnet 1. Such mounting arrangements are well known to a person with ordinary skill in the art. Any such mounting can be used.

An electrical coil is arranged at least partially around the moving element 5 and an electric current or voltage is induced in it when the magnetic flux changes. The spring force of a spring element 7 counteracts any externally introduced force. The externally introduced force then presses downward against the spring force and, above a specific magnitude, thus overcomes the magnetic holding forces, so that the externally introduced force initiates a rotary movement, which results in a sudden movement to the second rest position.

Figure 2:
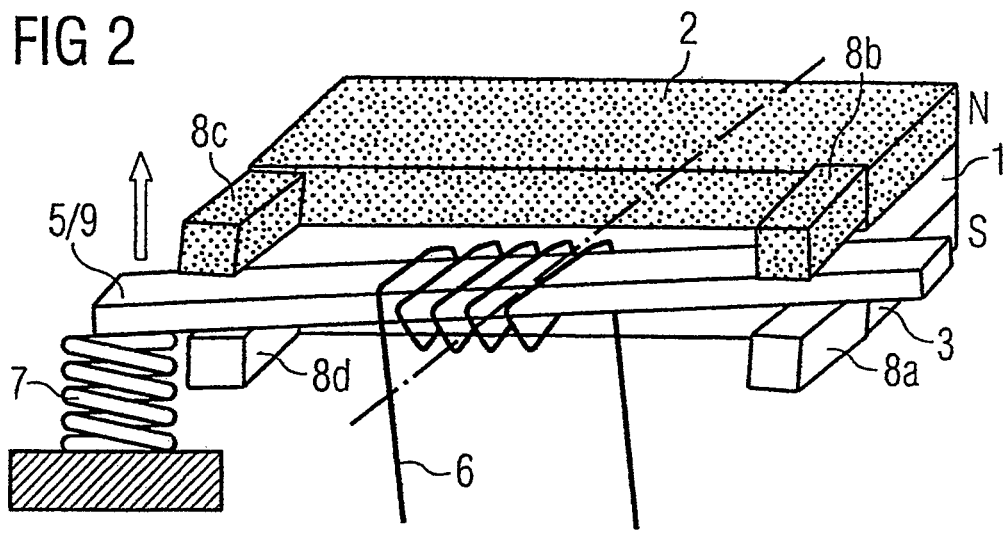
FIG. 2 shows an electromagnetic transducer in a second rest position.

This second rest position is illustrated in FIG. 2. Stop points 8a, 8b, 8c and 8d are formed on the permanent magnet 1. For example, stop points 8a and 8d are south poles stop points 8b and 8c are north poles. The rotary movement is possible only within these stop points. Abrupt striking of the moving element 5 against the stop points 8a to 8d thus results in an abrupt, in fact sudden, change in the magnetic flux direction in the moving element 5. In the exemplary embodiment, this moving element is advantageously in the form of a soft-magnetic element 9. This soft-magnetic embodiment allows rapid reorientation of the magnetic flux direction in the moving element. The spring force of the spring element 7 can be adjusted such that the second rest position illustrated in FIG. 2 is an unstable position, with the spring element driving the moving element 5 and/or the soft-magnetic element 9 back to the first rest position again, as illustrated in FIG. 1. This is an example of the most energy-efficient exemplary embodiment.

Figure 3:
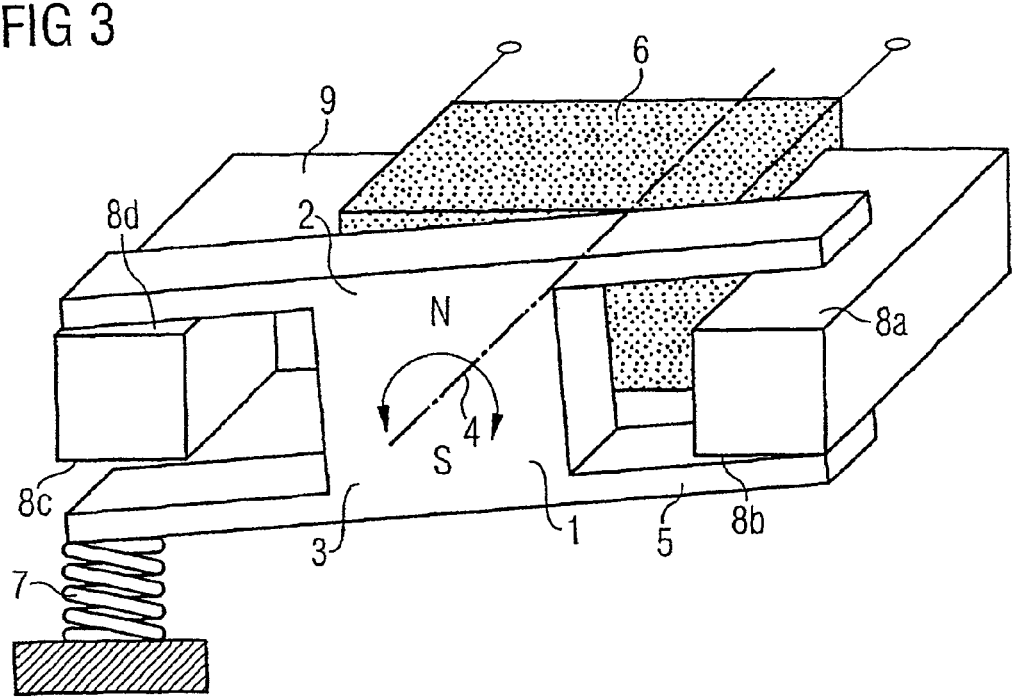
FIG. 3 shows another embodiment of an electromagnetic transducer.

FIG. 3 shows another embodiment of the energy transducer, with a different physical embodiment of the permanent magnet and of the soft-magnetic element 9. In this case, the permanent magnet 1 preferably also has a layer-like formation, thus forming a first permanent-magnet layer 2 and a second permanent-magnet layer 3. The axis 4 in this case once again represents the rotation axis about which the two elements are mounted such that they can rotate with respect to one another, in particular, however, with the permanent magnet being able to rotate within the degrees of freedom or angular degrees formed by the stop points 8a to 8d on soft-magnetic element 9. In this embodiment, the moving element 5 is in the form of a permanent magnet and the soft-magnetic element 9 is fixed to a stationary third element such as, for example, a housing. This is particularly advantageous for the contact points for the coil 6, since this embodiment then has a longer life because the electrical contact points of the coil 6 arranged on soft-magnetic element 9 are exposed to less mechanical wear.

Figure 4:
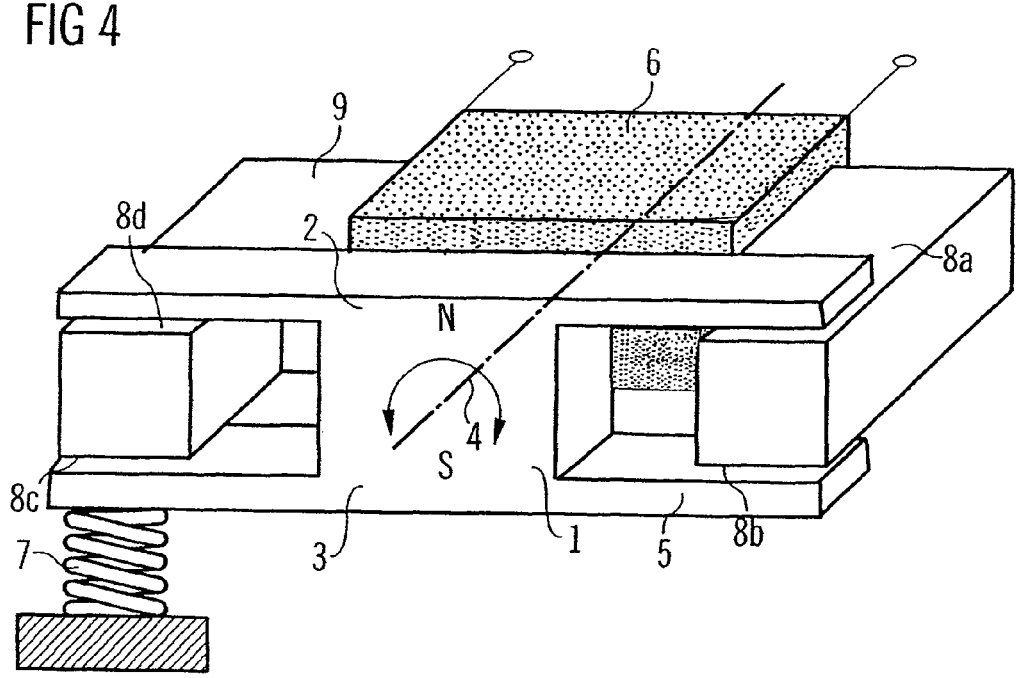
FIG. 4 shows yet another embodiment of an electromagnetic transducer.

As shown in FIG. 4, the spring element 7 could be designed such that the spring force is balanced by the magnetic forces in a mid-position of the rotary movement of the moving element 5. Energy then can be produced in the form of a push-button in both directions. The rotary movement then can be initiated in both possible directions.

In principle, the above-discussed embodiments are particularly suitable for use with radio switches which do not have their own power supply, but obtain the power supply for a radio signal from a switching pulse.

An energy transducer as is disclosed above makes it possible to carry out an energy conversion process when force is introduced and additionally when the force is removed. Furthermore, a minimum amount of energy can be converted independently of the rate of operation since, even if the force is introduced slowly, the time at which the holding force is exceeded results in a sudden snapping-action to the other rest position. This makes it possible to produce a toggle switch or momentary-contact switch in a simple manner. Since the polarity of the electrical power that is produced also differs depending on the direction in which the magnetic flux is changed, this information can initially be used in a radio switch in order, for example, to be able to map two different functions of a radio switch separately from one another.

When an externally introduced force is exerted on this moving part, nothing happens until the holding force produced by the permanent magnet in the moving part is exceeded. The moving part then moves relatively quickly to the second stable position, in which it remains fixed again by the latching forces of the permanent magnet. This snapping action takes place, even if the externally introduced force is increased slowly, at a minimum speed which can be varied by the design of the magnetic circuit. This ensures that sufficient energy for operation of the radio transmitter/radio switch is converted even in the event of slow application of the externally introduced force.

The magnetic flux through that part of the magnetic circuit 5 around which the coil 6 is wound (in the first embodiment) changes its direction on snapping around an axis 4 or a toggle point. This is preferable to designs in which the magnetic flux is just interrupted or closed, since the flux change is in this case twice as great.

The rapid magnetic flux change leads to voltage being induced briefly in the coil, and the electrical energy produced in this way can be rectified by means of rectifiers, preferably semiconductor metal contact diodes, and, after temporary storage in a capacitor, can be used to briefly operate a radio switch or radio sensor. It is also feasible to use a plurality of coils and to dispense with the rectification of the energy, which results in high losses, particularly in the case of low voltages.

The spring element 7 is used to form a momentary-contact switch from a changeover switch with two fixed positions. For this purpose, the spring force is of such a magnitude that, after the snapping action, the spring force is sufficient in order to quickly move the moving part back to the initial position again against the holding force as soon as the externally introduced force becomes sufficiently small. This allows a physically simple implementation of a monostable switch. In this case, according to this embodiment of the invention, energy is produced not only when the switch is pushed, but also when it is released.

The polarity of the voltage that is produced changes with the way of operation. According to the invention, this polarity can be measured by the connected electronics, and the information contained in it about the direction of the state change can be transmitted with the radio signal that is to be transmitted.

The mechanism which acts on the moving part of the energy transducer has at least one operating element, for example a surface of a push-button. According to the invention, a plurality of operating devices can also act in the same way on one energy transducer if the radio switch is intended to be implemented with a plurality of channels. In this case, a sufficient number of sensors, for example one sensor per operating device, are used to ensure that the respectively activated operating device is determined by the connected electronics. The information is then included in the radio message to be transmitted.

The radio transmitter which can be operated with the energy transducer has at least one operating device, which acts mechanically on the energy transducer to apply the externally introduced force. If it has a plurality of operating devices, these all act on the single energy transducer and, in addition to a suitable number of sensors, are used for detection of the respectively activated operating device. The information about the identity of the operating field can thus be included in the radio signal to be transmitted.

The information about the way of operation (pressing or releasing in the case of momentary-contact switches or pressing on different operating services in the case of toggle switches) can be sensed from the polarity of the voltage that is produced, and can likewise be transmitted by means of the radio signal.

The scope of protection of the invention is not limited to the examples given hereinabove. The invention is embodied in each novel characteristic and each combination of characteristics, which includes every combination of any features which are stated in the claims, even if this combination of features is not explicitly stated in the claims.

I claim:

1. An energy autonomous radio transmitting device, comprising:
   a radio transmitter;
   an electromagnetic energy transducer further comprising:
      two magnetic elements including a permanent magnetic element and a soft-magnetic element; and
      an electrical coil,
      wherein said permanent magnetic element and said soft-magnetic element are arranged to form a magnetic circuit, and one of the two magnetic elements is movable in relation to the other of the two magnetic elements through a range of motion limited by first and second stop points,
      wherein said electrical coil surrounds a part of said soft magnetic element,
      wherein the movable magnetic element is configured to be moved into a second position by applying an external mechanical force, and
      wherein at the first position the magnetic flux within the soft magnetic element is different than the flux at the second position; and
   a storage element electrically coupled to the electromagnetic energy transducer and the radio transmitter, the storage element configured to receive and temporarily store electrical energy generated by the electromagnetic energy transducer to power the radio transmitter,
   wherein the device is further configured to detect a polarity of a voltage generated by the electromagnetic energy transducer and transmit an indication of the polarity with the radio transmitter.

2. The device of claim 1, wherein at the first position at least in one of direction or strength, the magnetic flux within the soft magnetic element is different than the flux at the second position.

3. The device of claim 1, wherein the movable magnetic element moves from the second position back into the first position when the external mechanical force is removed.

4. The device of claim 1, wherein a first and a second limit position are formed for the movement of the movable magnetic element, wherein said first limit position is defined by one set of stop points, and said second limit position is defined by another set of stop points.

5. The device of claim 4, wherein a stable rest position is formed by magnetic latching forces in the first or second limit position.

6. The device of claim 1, wherein the movement is through an angle of less than 90°.

7. The device of claim 1, wherein the soft-magnetic material is iron, ferrite or a nickel/iron alloy, or is formed from electrical or transformer laminates.

8. The device of claim 1, wherein the electromagnetic transducer supplies electrical power to the radio transmitter.

9. The device of claim 1, further comprising an autonomous-power switch comprising a radio switch.

10. The device of claim 1, further comprising a contact portion configured to receive the applied external mechanical force.

11. The device of claim 1, wherein the soft magnetic element comprises a first end and a second end and the permanent magnet comprises a north pole and a south pole, and wherein the first end contacts the north pole and the second end contacts the south pole to form the magnetic circuit with the first flux direction, and the first end contacts the south pole and the second end contacts the north pole to form the magnetic circuit with the second flux direction.

12. The device of claim 1, wherein at least one operating element is coupled to the movable magnetic element.

13. The device of claim 12, further comprising at least one sensor configured to detect which of the at least one operating elements is activated.

14. A method for transmitting a signal, the method comprising:
generating electrical power with an energy autonomous device, the device comprising:
an electrical power storage element;
a radio transmitter electrically coupled to the storage element;
an electromagnetic energy transducer, the electromagnetic energy transducer further comprising:
two magnetic elements including a permanent magnetic element and a soft-magnetic element; and
an electrical coil,
wherein said permanent magnetic element and said soft-magnetic element are arranged to form a magnetic circuit, and one of the two magnetic elements is movable in relation to the other of the two magnetic elements through a range of motion limited by first and second stop points,
wherein said electrical coil surrounds a part of said soft magnetic element,
wherein the movable magnetic element is configured to be moved into a second position by applying an external mechanical force exceeding the spring force,
wherein at the first position the magnetic flux within the soft magnetic element is different than the flux at the second position, and
wherein the electrical power is generated and temporally stored in the storage element by applying an external mechanical force against the spring force and exceeding the spring force for moving the movable magnetic element into a second position so that the magnetic flux within the soft magnetic element is changed;
detecting a polarity of a voltage generated generated by the electromagnetic energy transducer; and
transmitting the signal including an indication of the polarity of the generated voltage with the radio transmitter, wherein the electrical energy stored in the storage element powers the radio transmitter.

15. The method for converting mechanical energy into electrical energy according to claim 14, wherein at least the direction or the strength of the magnetic flux within the soft magnetic element is changed.

16. The method for converting mechanical energy into electrical energy according claim 14, further comprising the step of reducing the external mechanical force to return the movable magnetic element to the first position.

* * * * *